(12) United States Patent
Cypher et al.

(10) Patent No.: US 7,366,843 B2
(45) Date of Patent: Apr. 29, 2008

(54) COMPUTER SYSTEM IMPLEMENTING SYNCHRONIZED BROADCAST USING TIMESTAMPS

(75) Inventors: Robert E. Cypher, Saratoga, CA (US);
David A. Wood, Madison, WA (US);
Mark D. Hill, Madison, WI (US);
Thomas M. Wicki, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1033 days.

(21) Appl. No.: 10/610,009

(22) Filed: Jun. 30, 2003

(65) Prior Publication Data

US 2004/0024925 A1 Feb. 5, 2004

Related U.S. Application Data

(60) Provisional application No. 60/392,178, filed on Jun. 28, 2002.

(51) Int. Cl.
*G06F 13/18* (2006.01)
(52) U.S. Cl. .................. 711/141; 711/141; 711/167; 710/4; 710/36; 710/52; 710/1
(58) Field of Classification Search ............. 711/141, 711/167; 710/4, 36, 52, 1
See application file for complete search history.

(56) References Cited

U.S. PATENT DOCUMENTS

| | | | |
|---|---|---|---|
| 5,761,721 A | | 6/1998 | Baldus et al. |
| 5,802,582 A | | 9/1998 | Ekanadham et al. |
| 5,935,428 A | * | 8/1999 | Yamamoto et al. ......... 210/128 |
| 5,978,874 A | * | 11/1999 | Singhal et al. .............. 710/107 |
| 6,088,768 A | | 7/2000 | Baldus et al. |
| 6,209,064 B1 | | 3/2001 | Weber |
| 6,928,519 B2 | | 8/2005 | Cypher |

(Continued)

OTHER PUBLICATIONS

"Specifying and Verifying a Broadcast and a Multicast Snooping Cache Coherence Protocol", Sorin, et al, *IEEE Transactions on Parallel and Distributed Systems*, vol. 13, No. 6, Jun. 2002, http://www.cs.wisc.edu/multifacet/papers/tpds02_lamport.pdf.

(Continued)

*Primary Examiner*—Gary Portka
*Assistant Examiner*—Yong J Choe
(74) *Attorney, Agent, or Firm*—Meyertons Hood Kivlin Kowert & Goetzel, P.C.; B. Noël Kivlin

(57) ABSTRACT

A computer system may include a system memory, an active device configured to access data stored in the system memory, where the active device includes a cache configured to store data accessed by the active device, an address network for conveying address packets between the active device and the system memory, and a data network for conveying data packets between the active device and the system memory. An access right corresponding to a given block allocated in the cache transitions in response to a corresponding data packet being received by the cache. An ownership responsibility for the given block transitions in response to a corresponding address packet being received by the cache. The access right transitions at a different time than the ownership responsibility transitions. The cache is configured to inhibit receipt of the corresponding data packet based on a value of a timestamp associated with the corresponding data packet.

20 Claims, 10 Drawing Sheets

U.S. PATENT DOCUMENTS 7,136,980 B2    11/2006    Cypher

OTHER PUBLICATIONS

"Multicast Snooping: A New Coherence Method Using a Multicast Address Network", Bilir, et al, *The 26th International Symposium on Computer Architecture*, IEEE, Atlanta, GA, May 2-4, 1999, http://csdl.computer.org/comp/proceedings/isca/1999/0170/00/01700294abs.htm.

"Architecture and Design of AlphaServer GS320", Gharachorloo, et al, *ACM Sigplan Notices*, vol. 35, Issue 11, Nov. 2000, http://portal.acm.org/citation.cfm?id=356991&dl=ACM&coll=portal.

"View Caching: Efficient Software Shared Memory for Dynamic Computations", Karamcheti, et al, *11th International Parallel Processing Symposium*, Geneva, Switzerland, Apr. 1-5, 1997, http://ipdps.eece.unm.edu/1997/s13/318.pdf.

"Cache-Coherent Distributed Shared Memory: Perspectives on Its Development and Future Challenges", Hennessy, et al, *Proceedings of the IEEE*, vol. 87, Issue 3, Mar. 1999, ISSN 0018-9219, http://cva.stanford.edu/cs99s/papers/hennessy-cc.pdf.

"A Survey of Cache Coherence Mechanisms in Shared Memory Multiprocessors", Lawrence, Department of Computer Science, University of Manitoba, Manitoba, Canada, May 14, 1998, http://www.cs.uiowa.edu/~rlawrenc/research/Papers/cc.pdf.

"Bandwidth Adaptive Snooping", Martin, et al. *8th Annual International Symposium on High-Performance Computer Architecture (HPCA-8)*, Cambridge, MA, Feb. 2-6, 2002.

"Timestamp Snooping: An Approach for Extending SMPs", Martin, et al., *9th International Conference on Architectural Support for Programming Languages and Operating Systems (ASPLOS-IX)*, Cambridge, MA, Nov. 13-15, 2000.

* cited by examiner

| Packet Type | Full Name | Address Space | | Description |
|---|---|---|---|---|
| | | Cacheable | I/O | |
| RTS | ReadToShare | Y | | Requests read-only copy of cache line |
| RTO | ReadToOwn | Y | | Requests writable copy of cache line |
| RTWB | ReadToWriteBack | Y | | Requests to receive writable copy of cache line and send cache line to memory |
| RS | ReadStream | Y | | Request read-once copy of cache line |
| WS | WriteStream | Y | | Request to write entire cache line and send to memory |
| WB | WriteBack | Y | | Request to send cache line from owning device to memory, device does not keep copy |
| WBS | WriteBackShared | Y | | Request to send cache line from owning device to memory, device keeps read-only copy |
| RIO | ReadIO | | Y | Request to read IO locations |
| WIO | WriteIO | | Y | Request to write IO locations |
| INT | Interrupt | | | Sends an interrupt, target is specified by address |

Fig. 2

| Transaction Type | Initiator Receives | Initiator Sends |
|---|---|---|
| RTS | DATA | |
| RTO | DATA | |
| RTWB | DATA & PRN | DATA |
| RS | DATA | |
| WS | ACK & PRN | DATA |
| WB | PRN | DATA or NACK |
| WBS | PRN | DATA or NACK |

Fig. 3

| Transaction Type | Initiator Receives | Initiator Sends |
|---|---|---|
| RIO | DATA | |
| WIO | PRN | DATA |
| INT | PRN or NACK | DATA or Nothing |

Fig. 4

| Access Rights Symbol | Access Rights Name | Description | Data Present? |
|---|---|---|---|
| W | Write | Read and Write | Yes (or ACK) |
| A | All-Write | Write-only, must write entire cache line | Yes |
| R | Read | Read-only | Yes |
| T | Transient-Read | Read-only, read can be reordered | Yes |
| I | Invalid | No access rights | Yes or No |

Fig. 5A

| Ownership Status Symbol | Ownership Status Name | Description | Data Present? |
|---|---|---|---|
| O | Owner | Owns cache line | Yes or No |
| N | Not Owner | Does not own cache line | Yes or No |

Fig. 5B

| Access Right | Ownership Status |
|---|---|
| W | O |
| R | O |
| I | O |
| W | N |
| A | N |
| R | N |
| T | N |
| I | N |

Fig. 5C

| Transaction Type | New Owner |
|---|---|
| RTS | Previous Owner |
| RTO | Initiator |
| RTWB | Memory |
| RS | Previous Owner |
| WS | Memory |
| WB | Memory (or Previous Owner) |
| WBS | Memory (or Previous Owner) |
Fig. 6
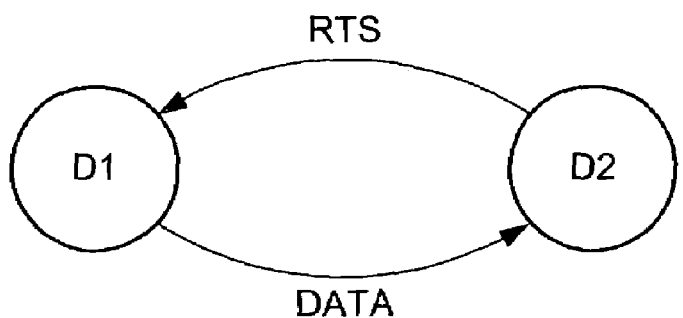
Fig. 7A
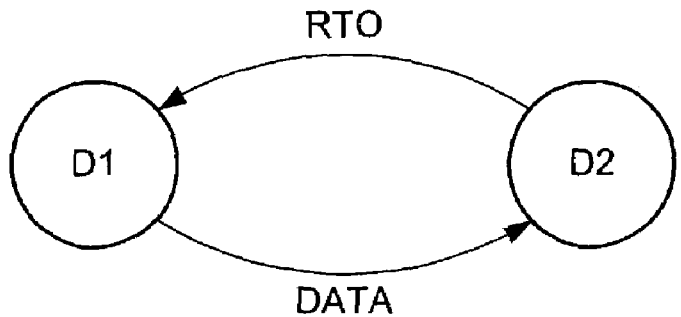
Fig. 7B

COMPUTER SYSTEM IMPLEMENTING SYNCHRONIZED BROADCAST USING TIMESTAMPS

This application claims the benefit of U.S. provisional patent application Ser. No. 60/392,178, filed Jun. 28, 2002.

BACKGROUND OF THE INVENTION

1. Field of the Invention

This invention relates to the field of multiprocessor computer systems and, more particularly, to coherency protocols employed within multiprocessor computer systems having shared memory architectures.

2. Description of the Related Art

Multiprocessing computer systems include two or more processors that may be employed to perform computing tasks. A particular computing task may be performed upon one processor while other processors perform unrelated computing tasks. Alternatively, components of a particular computing task may be distributed among multiple processors to decrease the time required to perform the computing task as a whole.

A popular architecture in commercial multiprocessing computer systems is a shared memory architecture in which multiple processors share a common memory. In shared memory multiprocessing systems, a cache hierarchy is typically implemented between the processors and the shared memory. In order to maintain the shared memory model, in which a particular address stores exactly one data value at any given time, shared memory multiprocessing systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches that are storing copies of the previous data. Alternatively, the copies of the previous data may be invalidated in the caches such that a subsequent access to the particular memory address causes the updated copy to be transferred from main memory.

Shared memory multiprocessing systems generally employ either a snooping cache coherency protocol or a directory-based cache coherency protocol. In a system employing a snooping protocol, coherence requests are broadcast to all processors (or cache subsystems) and memory through a totally ordered address network. Each processor "snoops" the requests from other processors and responds accordingly by updating its cache tags and/or providing the data to another processor. For example, when a subsystem having a shared copy of data observes a coherence request for exclusive access to the block, its copy is typically invalidated. Likewise, when a subsystem that currently owns a block of data observes a coherence request to that block, the owning subsystem typically responds by providing the data to the requestor and invalidating its copy, if necessary. By delivering coherence requests in a total order, correct coherence protocol behavior is maintained since all processors and memories observe requests in the same order.

In a standard snooping protocol, requests arrive at all devices in the same order, and the access rights of the processors are modified in the order in which requests are received. Data transfers occur between caches and memories using a data network, which may be a point-to-point switched network separate from the address network, a broadcast network separate from the address network, or a logical broadcast network which shares the same hardware with the address network. Typically, changes in ownership of a given cache block occur concurrently with changes in access rights to the block.

Unfortunately, the standard snooping protocol suffers from a significant performance drawback. In particular, the requirement that access rights of processors change in the order in which snoops are received may limit performance. For example, a processor may have issued requests for cache blocks A and B, in that order, and it may receive the data for cache block B (or already have it) before receiving the data for cache block A. In this case the processor must typically wait until it receives the data for cache block A before using the data for cache block B, thus increasing latency. The impact associated with this requirement is particularly high in processors that support out-of-order execution, prefetching, multiple core per-processor, and/or multi-threading, since such processors are likely to be able to use data in the order it is received, even if it differs from the order in which it was requested.

The other standard approach to cache consistency uses a directory-based protocol. In systems that implement a directory-based protocol, both the address network and the data network are typically point-to-point, switched networks. When a processor requests a cache block, the request is sent to a directory that maintains information regarding the processors that have copies of the cache block and their access rights. The directory then forwards the request to those processors that must change their access rights and/or provide data for the request (or if needed, the directory will access the copy of the cache block in memory and provide the data to the requester). Since there is no way of knowing when the request arrives at each processor to which it is sent, all processors that receive the request must typically acknowledge reception by providing data or sending an acknowledge (ACK) message to either the requester or the directory, depending on the protocol.

Typical systems that implement a directory-based protocol may be associated with various drawbacks. For example, such systems may suffer from high latency due to the requirement that requests go first to a directory and then to the relevant processors, and/or from the need to wait for acknowledgment messages. In addition, when a large number of processors must receive the request (such as when a cache block transitions from a widely shared state to an exclusive state), all of the processors must typically send ACKs to the same destination, thus causing congestion in the network near the destination of the ACKs and requiring complex logic to handle reception of the ACKs. Finally, the directory itself may add cost and complexity to the system.

SUMMARY OF THE INVENTION

In one embodiment, a computer system includes a system memory, a first active device configured to access data stored in the system memory, where the first active device includes a first cache configured to store data accessed by the first active device, an address network for conveying address packets between the first active device and the system memory, and a data network for conveying data packets between the first active device and the system memory. An access right corresponding to a given block allocated in the first cache transitions in response to a corresponding data packet being received by the first cache. An ownership responsibility for the given block allocated in the first cache transitions in response to a corresponding address packet being received by the first cache. The access right transitions at a different time than the ownership responsibility transitions. The first cache is configured to inhibit receipt of the corresponding data packet based on a value of a timestamp associated with the corresponding data packet.

BRIEF DESCRIPTION OF THE DRAWINGS

Other objects and advantages of the invention will become apparent upon reading the following detailed description and upon reference to the accompanying drawings in which:

FIG. 2 is a chart illustrating various transactions that may be supported in one embodiment of a computer system.

FIG. 3 illustrates data packet transfers in accordance with one embodiment of a computer system.

FIG. 4 illustrates various non-cacheable transaction types that may be supported in one embodiment of a computer system.

FIGS. 5A and 5B illustrates types of access rights and ownership status that are possible in one embodiment of a computer system.

FIG. 5C illustrates possible combinations of access rights and ownership status.

FIG. 6 is a chart illustrating ownership transitions in response to particular transactions in one embodiment of a computer system.

FIGS. 7A-7F illustrate exemplary coherence operations which may be implemented in one embodiment of a computer system.

Figure 1:
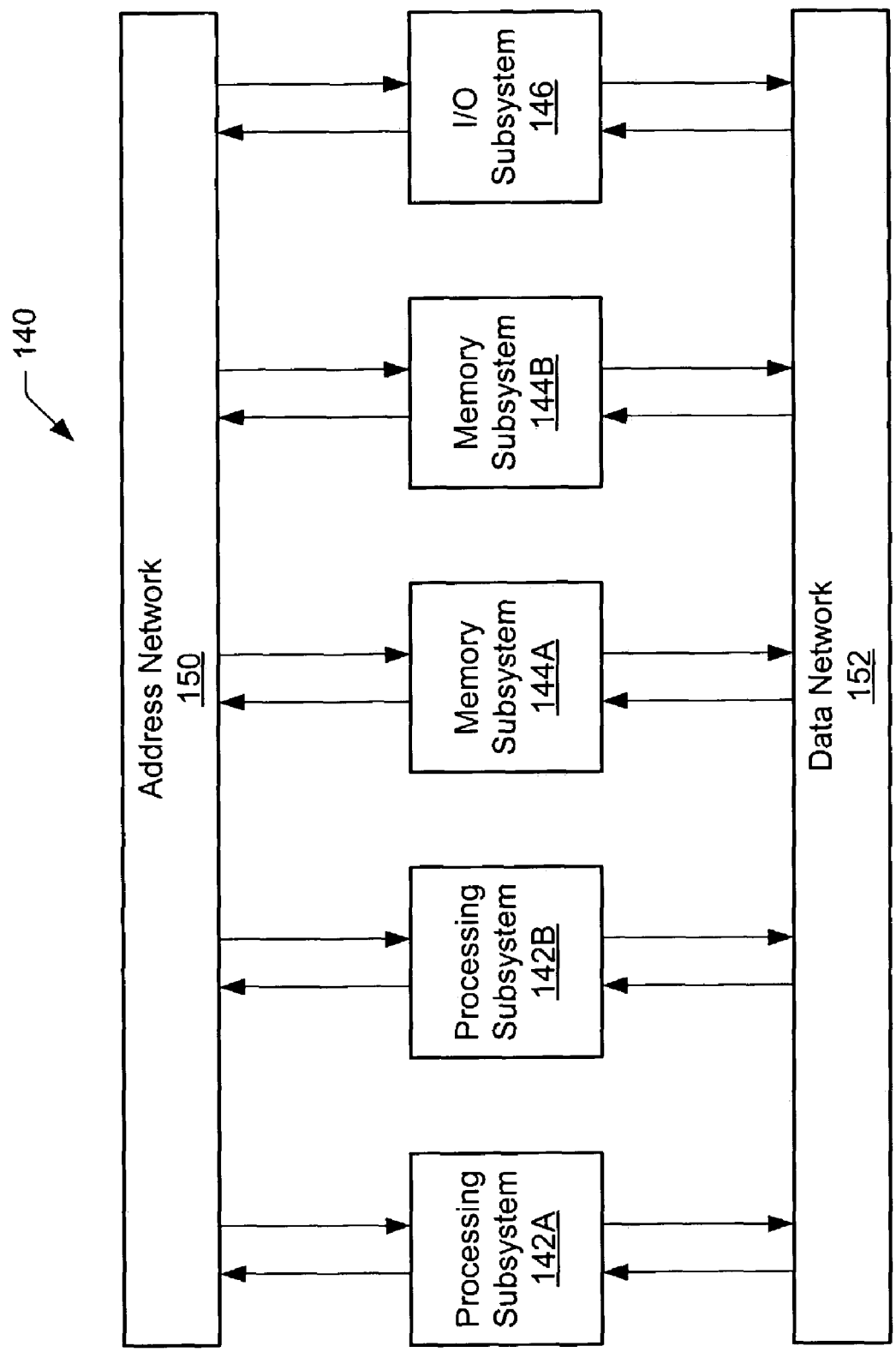
FIG. 1 is a block diagram of a multiprocessing computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 shows a block diagram of one embodiment of a computer system 140 is shown. Computer system 140 includes processing subsystems 142A and 142B, memory subsystems 144A and 144B, and an I/O subsystem 146 interconnected through an address network 150 and a data network 152. In the embodiment of FIG. 1, each of processing subsystems 142, memory subsystems 144, and I/O subsystem 146 are referred to as a client device. It is noted that, although five client devices are shown in FIG. 1, embodiments of computer system 140 employing any number of client devices are contemplated. Elements referred to herein with a particular reference number followed by a letter will be collectively referred to by the reference number alone. For example, processing subsystems 142A-142B will be collectively referred to as processing subsystems 142.

Generally speaking, each of processing subsystems 142 and I/O subsystem 146 may access memory subsystems 144. Devices configured to perform accesses to memory subsystems 144 are referred to herein as "active" devices. Each client in FIG. 1 may be configured to convey address transactions on address network 150 and data on data network 152 using split-transaction packets. Processing subsystems 142 may include one or more instruction and data caches which may be configured in any of a variety of specific cache arrangements. For example, set-associative or direct-mapped configurations may be employed by the caches within processing subsystems 142. Because each of processing subsystems 142 within node 140 may access data in memory subsystems 144, potentially caching the data, coherency must be maintained between processing subsystems 142 and memory subsystems 144, as will be discussed further below.

Memory subsystems 144 are configured to store data and instruction code for use by processing subsystems 142 and I/O subsystem 146. Memory subsystems 144 preferably comprise dynamic random access memory (DRAM), although other types of memory may be used. Each address in the address space of computer system 140 may be assigned to a particular memory subsystem 144, referred to as the home subsystem of the address.

I/O subsystem 146 is illustrative of peripheral devices such as, for example, an input-output bridge, a graphics device, a networking device, etc. In various embodiments, I/O subsystem 146 may include a cache memory subsystem similar to those of processing subsystems 142 for caching data associated with addresses mapped within one of memory subsystems 144.

In one embodiment, data network 152 may be a logical point-to-point network. Data network 152 may be implemented as an electrical bus, a circuit-switched network, or a packet-switched network. In embodiments where data network 152 is a packet-switched network, packets may be sent through the data network using techniques such as wormhole, store and forward, or virtual cut-through. In a circuit-switched network, a particular client device may communicate directly with a second client device via a dedicated point-to-point link that may be established through a switched interconnect mechanism. To communicate with a third client device, the particular client device utilizes a different link as established by the switched interconnect than the one used to communicate with the second client device. Data network 152 may implement a source-destination ordering property such that if a client device C1 sends a data message D1 before sending a data message D2 and a client device C2 receives both D1 and D2, C2 will receive D1 before C2 receives D2.

In the embodiment of FIG. 1, address network 150 implements a broadcast network in which address transactions are conveyed to all client devices. Address network 150 may be embodied physically using a point-to-point, switched network configured to broadcast address transactions. Address network 150, as well as data network 152, may be implemented using a multi-stage switching hierarchy. In alternative embodiments, address network 150 may be implemented using a common bus structure. Address network 150 may be embodied in hardware that is separate from data network 152, or in hardware that is shared with data network 152.

Address network 150 accommodates communication between processing subsystems 142, memory subsystems 144, and I/O subsystem 146. Messages upon address network 150 are generally referred to as address packets. When the address packet references a storage location within a memory subsystem 144, the location referenced may be specified via an address conveyed within the address packet upon address network 150. Subsequently, data corresponding to the address packet on the address network 150 may be conveyed upon data network 152. Typical address packets correspond to requests for an access right (e.g., a readable or writable copy of a cacheable coherency unit) or requests to perform a read or write to a non-cacheable memory location. Address packets may be sent by a device in order to initiate a coherence transaction. In the computer system 140 shown in FIG. 1, a coherence transaction may include one or more packets upon address network 150 and data network 152. Typical coherence transactions involve at least one address packet and one or more data packets. These packets implement data transfers, ownership transfers, and/or changes in access privileges. It is noted that address network 150 may serve as an ordering point for transactions involving a given cacheable coherency unit, and thus it is possible to refer to such transactions as occurring "before" or "after" each other. The ordering point for transactions involving non-cacheable coherency units may be the target device of the transaction.

In one embodiment, read-to-share (RTS) transactions may be initiated by active devices upon address network 150 to request read-only copies of cache blocks. Similarly, read-to-own (RTO) transactions may be initiated by active devices to request writable copies of cache blocks. Other coherence transactions may similarly be initiated by active devices upon address network 150, as desired.

FIG. 2 is a chart illustrating various transactions, including a description for each, that may be supported by one embodiment of computer system 140. As illustrated, in addition to read-to-share and read-to-own transactions, further coherence transactions that may be supported include read-stream (RS) transactions, write-stream (WS) transactions, write-back (WB) transactions, and write-back shared (WBS) transactions. A read-stream transaction requests a read-once copy of a cache block. A write-stream transaction is a request to write an entire cache block and send the cache block to memory. A write-back transaction is a request to send a cache block from an owning, device to memory, where the owning device does not keep a copy. Finally, a write-back shared transaction is a request to send a cache block from an owning device to memory, where the owning device keeps a read-only copy. Active devices may also be. configured to initiate other transaction types on address network 150 such as, for example, I/O read and write transactions and interrupt transactions. In one embodiment, a read-to-writeback (RTWB) transaction may also be supported to allow I/O bridges (or other devices) to perform a write to part of a cache block without gaining ownership of the cache block and responding to foreign requests for the cache block.

It is noted that transactions may be conveyed upon address network 150 in the form of encoded packets including a specified address. Data packets conveyed on data network 152 may be associated with corresponding address transactions using transaction IDs, as discussed below.

In one embodiment, cacheable transactions result in at least one packet being received by the initiating client on the data network 152. In addition, some transactions may require that a packet be sent from the initiating client on the data network 152. FIG. 3 illustrates data packet transfers on data network 152 that may result from various transactions in accordance with one embodiment of computer system 140. A PRN data packet type is a pull request, sent from the destination of a write transaction to the source of the write transaction, to send data. An ACK data packet type is a positive acknowledgment from an owning device allowing a write stream transaction to be completed. A NACK data packet type is a negative acknowledgment to memory aborting a WB, WBS, or to the initiator aborting an INT transaction.

When an initiator initiates a transaction, the address packet for that transaction may include a transaction ID formed by the initiator's device ID and a packet ID, which is assigned by the initiator. The DATA, ACK and/or PRN packets that the initiator receives may be routed to the initiator through data network 152 by placing the initiator's device ID in the packets' routing prefix. In addition, the DATA, ACK and/or PRN packets may contain a destination packet ID field which matches the packet ID assigned by the initiator, thus allowing the initiator to match the DATA, ACK, and/or PRN packet to the correct transaction. Furthermore, PRN packets may include a pull ID consisting of the source's device ID and a packet ID, which is assigned by the source (that is, the client which sent the PRN packet). After receiving a PRN packet, the initiator may send a DATA or NACK packet to the source of the PRN. This DATA or NACK packet may be routed by placing the device ID of the source of the PRN in the packet's routing prefix, and may contain a destination packet ID field which allows it to be matched with the correct PRN (in addition, the packet may include a flag which indicates that it was sent in response to a PRN, thus preventing confusion between transaction IDs and pull IDs).

In one embodiment, the ACK packet which may be sent in response to a WS does not contain any data. The ACK packet may be used to indicate the invalidation of the previous owner. The PRN packet which an initiator receives in response to a cacheable transaction is sent by the memory device that maps the cache block. The DATA or NACK packet which the initiator sends is sent to the memory device that maps the cache block (which is also the source of the PRN received by the initiator).

As illustrated in FIG. 3, the initiator may receive separate DATA and PRN packets for a RTWB transaction. However, when the owner of the cache block is the memory device that maps the cache block, these two packets would be sent by the same client. Thus, in one embodiment, instead of sending two packets in this situation, a single DATAP packet may be sent which combines the information of a DATA packet and a PRN packet. Similarly, a single PRACK packet, which combines the information of a PRN packet and an ACK packet, may be sent in response to a WS transaction when the owner of the cache block is the memory device that maps the cache block. Finally, in those cases where the initiator is the owner of the cache block, the initiator may not send a DATA or ACK packet to itself (this can be viewed logically as a transmission of a DATA or ACK packet from the initiator to itself which does not leave the initiator). Similarly, in those cases where the initiator is the memory device that maps the cache block, the initiator may not send a PRN packet to itself, nor need it send a DATA or NACK packet to itself.

In the embodiment of FIG. 1, non-cacheable transactions may similarly result in at least one packet being received by the initiating client from the data network, and some transactions may require that a packet be sent from the initiating client device on the data network. FIG. 4 illustrates various non-cacheable transaction types that may be supported in one embodiment of computer system 140, along with resulting data packet types that may be conveyed on data network 152. The columns in FIG. 4 are indicative of the sequence of packets sent on the address and data networks, in order from left to right.

The DATA, PRN, or NACK packets that an initiator may receive in response to non-cacheable transaction types are routed to the initiator through data network 152 and may be matched to the correct transaction at the receiver through the use of transaction IDs, as was described for cacheable data transfers. Similarly, the DATA packets that the initiator sends may be routed to their destination and matched to the correct transaction at their destination through the use of pull IDs, as was described for cacheable transactions.

For RIO and WIO transactions, the DATA, and/or PRN packets which the initiator receives are sent from the client that maps the block. For INT transactions, the PRN or NACK packet which the initiator receives is sent from the target of the interrupt (which may be specified in an address field of the INT packet). When the initiator sends a DATA packet, it sends the DATA packet to the source of the PRN which it received. It is noted that when the initiator would be both the source and destination of a DATA, PRN, or NACK packet, no DATA, PRN, or NACK packet needs to be sent. It is also noted that when an initiator receives a PRN packet in response to an INT transaction, the initiator sends a data packet. When the initiator receives a NACK packet in response to an INT transaction, the initiator may not send any packet on the data network.

As will be described in further detail below, in one embodiment computer system 140 is configured to satisfy the following two properties (where a packet is defined to be "received" when any changes in ownership status and/or access rights in response to the packet at the receiving processor have been made, if necessary, pursuant to the coherence protocol):

1) Ordered broadcasts: if an address broadcast B1 is received before another address broadcast B2 at a processor (or other device) P1, then B1 is also received before B2 at every other processor (and every other active device) P2, and 2) Synchronized broadcasts: if a data packet D1 is sent from a processor (or other device) P1 after P1 received an address broadcast B1, and if D1 is received at a processor (or other device) P2, then P2 receives B1 before P2 receives D1.

Computer system 140 employs a cache coherence protocol to provide a coherent view of memory for clients with caches. For this purpose, state information for each cache block may be maintained in each active device. The state information specifies the access rights of the active device and the ownership responsibilities of the active device.

The access right specified by the state information for a particular cache block is used to determine whether the client device can commit a given operation (i.e., a load or a store operation) and constraints on where that operation can appear within one or more partial or total orders. In one embodiment, the memory access operations appear in a single total order called the "global order". In such an embodiment, these constraints upon where an operation can be placed in the global order can be used to support various well-known memory models, such as, for example, a sequentially consistent memory model or total-store-order (TSO), among others.

The ownership responsibility specified by the state information for a particular cache block indicates whether the client device is responsible for providing data of the cache block to another client that requests it. A client device owns a cache block if it is responsible for providing data to another client which requests it.

In one embodiment, the coherence protocol employed by computer system 140 is associated with the following properties:

1) Changes in ownership status occur in response to the reception of address packets. Sending address packets, sending data packets, and receiving data packets do not affect the ownership status.

2) An active device may own a cache block without having the data associated with that ownership responsibility.

3) Access rights transition with receiving address packets, sending data packets, and receiving data packets. Sending address packets does not affect the access rights (although it may affect the way in which other packets are processed).

4) An active device which has an access right to a cache block always has the data associated with that access right.

5) Reception of address packets is not blocked based on the reception of particular data packets. For example, it is possible to receive a local read request packet before the data being requested is also received.

Since access rights and ownership status can transition separately in the protocol employed by computer system 140, various combinations of coherence states are possible. FIGS. 5A and 5B illustrate types of access rights and ownership status that are possible in one embodiment of computer system 140. FIG. 5C illustrates possible combinations of access rights and ownership status. It is noted that these combinations differ from those of traditional coherence protocols such as the well-known MOSI protocol. It is also noted that other specific forms of access rights may be defined in other embodiments.

As illustrated in FIG. 5A, the W (Write) access right allows both reads and writes. The A (All-Write) access right allows only writes, and requires that the entire cache block be written. The R (Read) access right allows only reads. The T (Transient-Read) access right allows only reads; however, unlike reads performed under the W or R access rights, reads performed under the T access right may be reordered, as discussed below. Finally, the I (Invalid) access right allows neither reads nor writes. When the system is first initialized, all active devices have the I access right for all cache blocks. As will be discussed further below, when a cache block is in the A access right state, because the entire cache block must be modified, the data contained in the cache block prior to this modification is not needed and may not be present. Instead, an ACK packet, which acts as a token representing the data, must have been received if the data is not present.

As illustrated in FIG. 5B, an active device may have an O (owner) ownership status or an N (non-owner) ownership status with respect to a given cache block. In either state, data corresponding to the cache block may or may not be present in the cache.

Once an active device has acquired a given access right, it may exercise that access right repeatedly by performing multiple reads and/or writes, until it loses the access right. It is noted that for access rights other than A (All-Write), an active device may neither read nor write the given cache block, even though its access right allows it to do so. The A access right requires that the entire block be written, so the active device must perform at least one write to each byte in the block.

In the embodiment of FIG. 1, changes in access rights may occur in response to receiving address packets, sending data packets, or receiving data packets. Generally speaking, and as will be described in further detail below, when a request transfers exclusive access to a cache block from a processor P1 to a processor P2, the sending of the data from P1 terminates P1's access right to the block and the reception of the data at P2 initiates its access right. When a request changes exclusive access to a cache block at a processor P1 to a shared state (i.e., each having a read access right) with a processor P2, the sending of the data from P1 terminates P1's write access right (though it can continue to read the cache block) and the arrival of the data at P2 initiates its shared access right. When a request transfers a cache block from a shared state to exclusive access at a processor P2, the access rights at all processors other than P2 and the processor which owns the cache block (if any) are terminated upon reception of the broadcast request, the access right of the processor that owns the cache block (if there is one) is terminated when it sends the data, and the write access right at P2 is initiated once P2 has received the data from the previous owner (or from memory). Finally, when a request adds a processor P2 to a set of processors that is already sharing a cache block, no processor loses access rights and P2 gains the read access right when it receives the data.

Ownership responsibilities may transition in response to the reception of address packets. In the embodiment of FIG. 1, sending and receiving data packets do not affect ownership responsibilities. FIG. 6 is a chart illustrating ownership transitions in response to particular transactions in one embodiment of computer system 140. In FIG. 6, "previous owner" indicates that ownership is unchanged, "initiator" indicates that the client which initiated the transaction becomes the owner, and "memory" indicates that the memory subsystem 144 which maps the cache block becomes the owner. The owner of the cache block is either an active device or the memory device which maps the cache block. Given any cacheable transaction T which requests a data or ACK packet, the client that was the owner of the cache block immediately preceding T will send the requested data or ACK packet. When the system is first initialized, memory is the owner for each cache block.

Figure 7C:
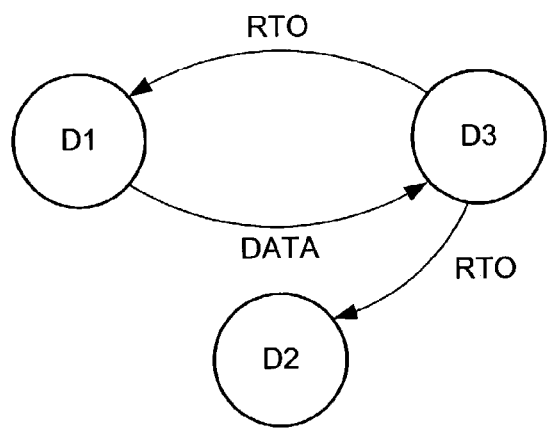

The transitioning of access rights and ownership responsibilities of client devices in one embodiment of computer system 140 may be better understood with reference to the exemplary coherence operations depicted in FIGS. 7A-7F. FIG. 7A illustrates a situation in which an active device D1 has a W access right and ownership and an active device D2 initiates an RTS in order to obtain the R access right. In this case, D1 will receive the RTS packet from D2 through address network 150. In response to the RTS, D1 sends a corresponding data packet (containing the requested data) to device D2. It is noted that D1 can receive additional address and/or data packets before sending the corresponding data packet to D2. When D1 sends the corresponding data packet to D2, D1 loses its W access right, and changes its access right to an R access right. When D2 receives the corresponding data packet, it acquires an R access right (D2's access right was previously I). D1 continues to maintain ownership of the cache block.

FIG. 7B illustrates a situation in which an active device D1 has a W access right and ownership, and an active device D2 initiates an RTO transaction in order to obtain a W access right. In this case D1 will receive the RTO packet from D2 over address network 150. As a result, D1 changes its ownership status to N (not owner) and sends a corresponding data packet to D2. It is noted, however, that D1 can receive additional address and/or data packets before sending the corresponding data packet to D2. It is also noted that D2 also receives its own RTO via address network 150. When D1 sends the corresponding data packet to D2, D1 loses its W access right, and changes its right to an I access right. When D2 receives its own RTO via address network 150, its ownership status changes to O (owned). When D2 receives the corresponding data packet, it acquires a W access right.

FIG. 7C illustrates a situation in which an active device D1 has an R access right and ownership, active device D2 also has an R access right (but not ownership), and active device D3 issues an RTO in order to obtain a W access right (D3 may initially have either an I or R access right). In this case, D1 will receive the RTO from D3 via address network 150. As a result, D1 changes its ownership status to N and sends a corresponding data packet to D3. It is noted, however, that D1 can receive additional address and/or data packets before sending the corresponding data packet to D3. When D1 sends the corresponding data packet to D3, D1 changes its access right to an I access right. In addition, D2 will also receive the RTO via address network 150. When D2 receives the RTO, it changes its R access right to an I access right. Furthermore, when D3 receives its own RTO via address network 150, its ownership status is changed to O. When D3 receives the corresponding data packet, it acquires a W access right. It is noted that the corresponding data packet and the local RTO may be received by D3 before the invalidating RTO packet arrives at D2. In this case, D2 could continue to read the cache block even after D3 has started to write to it.

Figure 7D:
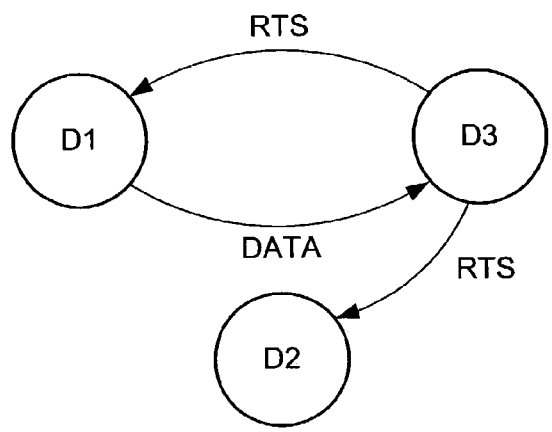

FIG. 7D illustrates a situation in which an active device D1 has an R access right and ownership, active device D2 has an R access right, and active device D3 issues an RTS in order to obtain the R access right. In this case, D1 will receive the RTS from D3 via the address network 150. As a result, D1 sends a corresponding data packet to D3. When D3 receives the corresponding data packet, its access right changes from an I access right to an R access right. The reception of the RTS at D1 and D2 does not cause a change in the access rights at D1 or D2. Furthermore, no change in ownership results.

In the case of a WS (Write Stream) transaction, in which an entire cache block is written by an active device and sent to memory, the device performing the WS may receive an ACK packet from the processing subsystem 142 (or memory subsystem 144) that most recently (in address broadcast order) owned the cache block. It is noted that this ACK packet may be in place of a regular data message (and in fact a data message could be used), and that only one such ACK message may be sent in response to the WS.

Figure 7E:
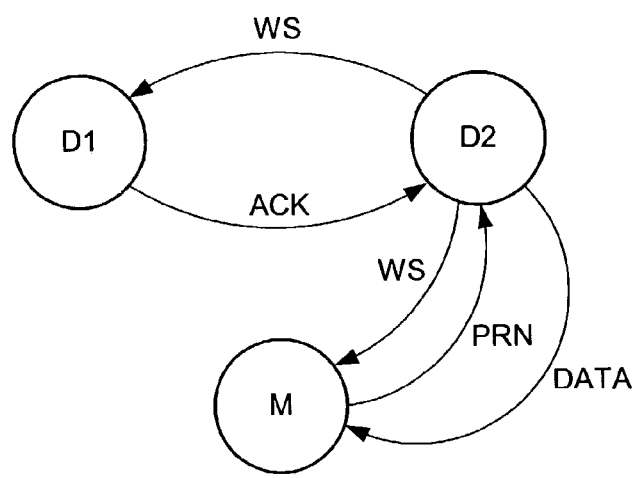

FIG. 7E illustrates a situation in which an active device D1 has an R or W access right and ownership, and an active device D2 issues a WS transaction. As shown, the WS transaction is received by D1 as well as the memory subsystem 144 that maps the cache block through address network 150. As a result, D1 sends a corresponding ACK packet to D2. It is noted, however, that D1 can receive additional address and/or data packets before sending the corresponding ACK packet to D2. When D1 sends the corresponding ACK packet to D2, D1 changes its access right to an I access right. When D2 receives the ACK packet from D1, its access right changes to A (All-Write). In addition, the memory subsystem (M) that maps the cache block forwards a PRN packet on data network 152 to D2. When D2 writes to the entire cache block, D2 forwards a data packet to the memory, subsystem M. Upon receipt of the WS transaction through address network 150, D1 changes its ownership status to N (not-owned), and the memory subsystem M changes its ownership status to owned.

Figure 7F:
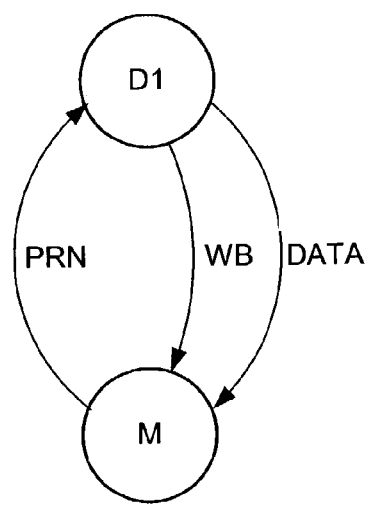

FIG. 7F illustrates a situation in which an active device D1 has a W access right and ownership, and issues a WB transaction in order to write back data to memory. The memory subsystem (M) that maps the cache block receives the WB packet through address network 150, and responsively forwards a PRN packet through data network 152 to D1. As a result, D1 sends a corresponding data packet to memory M. It is noted that D1 can receive additional address and/or data packets before sending the corresponding data packet to memory M. When D1 receives its own WB through address network 150, its ownership status changes to N. When D1 sends the corresponding data packet to memory M, its access right is changed to an I access right. Following this sequence of transactions, memory M becomes the owner of the cache block. WBS (write-back shared) transactions may be handled similarly.

It is contemplated that numerous variations of computer systems may be designed that employ the principle rules for changing access rights in active devices as described above. Such computer systems may advantageously maintain cache consistency while attaining efficient operation. It is noted that embodiments of computer system 140 are possible that implement subsets of the transactions described above in conjunction with FIGS. 7A-7F. Furthermore, other specific transaction types may be supported, as desired, depending upon the implementation.

It is also noted that variations with respect to the specific packet transfers described above for a given transaction type may also be possible. Additionally, while ownership transitions are performed in response to receipt of address packets in the embodiments described above, ownership transitions may be performed differently as a result of certain coherence transactions in other embodiments.

In addition, in accordance with the description above, an owning device may not send a corresponding data packet immediately in response to a transaction (such as an RTO or RTS) initiated by another device. In one embodiment, a maximum time period (e.g., maximum number of clock cycles, etc.) may be used to limit the overall length of time an active device may expend before sending a responsive data packet.

The synchronized broadcast property identified above could be achieved using various mechanisms. For example, the synchronized broadcast property could be achieved by creating a globally synchronous system running on a single clock, and tuning the paths in address network 150 to guarantee that all broadcasts corresponding to a given transaction arrive at all devices upon the same cycle. In such a system, address packets may be received without buffering them in queues. While such implementations are possible, it may instead be desirable to allow for higher communication speeds using source-synchronous signaling, in which a source's clock is sent along with a particular packet. In such implementations, the cycle at which the packet will be received may not be known in advance. In addition, it may further be desirable to provide queues for incoming address packets to allow devices to temporarily receive packets without flow controlling the address network 150.

Figure 8:
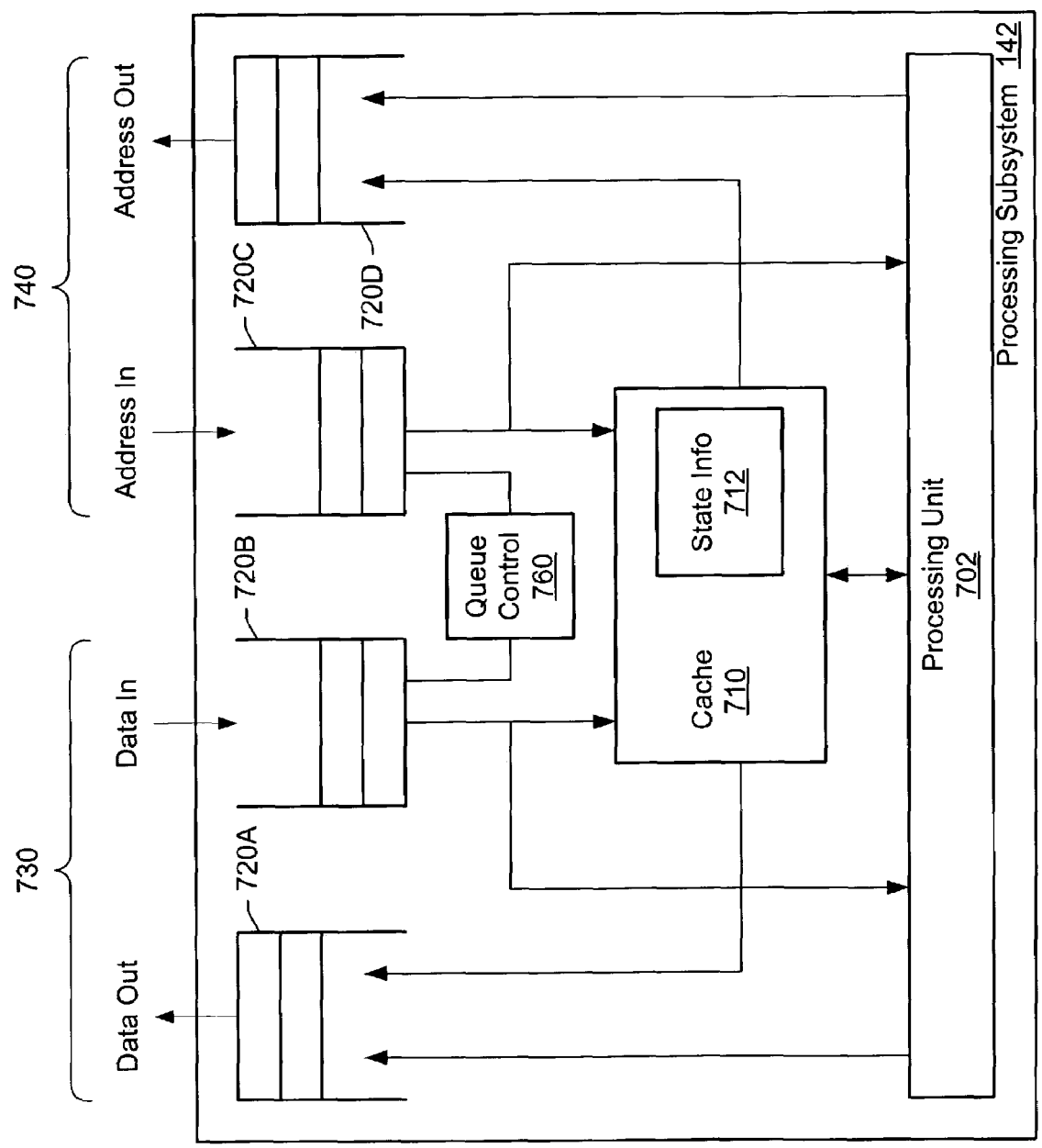
FIG. 8 is a block diagram illustrating details of one embodiment of each of the processing subsystems of FIG. 1.

Details regarding one implementation of computer system 140 which maintains the synchronized broadcasts property without requiring a globally synchronous system and which allows address packets to be buffered will thus be described next in conjunction with FIG. 8. FIG. 8 is a block diagram illustrating details of one embodiment of each of the processing subsystems 142 of computer system 140. Included in the embodiment of FIG. 8 are a processing unit 702, cache 710, and queues 720A-720D. Queues 720A-720B are coupled to data network 152 via data links 730, and queues 720C-720D are coupled to address network 150 via address links 740. Each of queues 720 comprises a plurality of entries each configured to store an address or data packet. Processing unit 702 is shown coupled to cache 710. Cache 710 may be implemented using a hierarchical cache structure.

Processing unit 702 is configured to execute instructions and perform operations on data stored in memory subsystems 144. Cache 710 may be configured to store copies of instructions and/or data retrieved from memory subsystems 144. In addition to storing copies of data and/or instructions, cache 710 also includes state information 712 indicating the coherency state of a particular cache block within cache 710, as discussed above. In accordance with the foregoing, if processing unit 702 attempts to read or write to a particular cache block, and cache state info 712 indicates processing unit 702 does not have adequate access rights to perform the desired operation, an address transaction comprising a coherency request may be inserted in address out queue 720D for conveyance on address network 150. Subsequently, data corresponding to the cache block may be received via data-in queue 720B.

In addition, processing subsystem 142 may receive coherency demands via address-in queue 720C, such as a read-to-own or read-to-share transaction initiated by another active device (or initiated by itself). If, for example, processing subsystem 142 receives a transaction corresponding to a read-to-own request initiated by a foreign device for a memory block, the corresponding memory block may be returned via data out queue 720A (e.g., if the cache block was owned by the processing subsystem 142), and/or the state information 712 for that block may be changed to invalid, as discussed above. Other coherence transactions as well as non-cacheable transactions may similarly be received through address-in queue 720C. Memory subsystems 144 and I/O subsystem 146 may be implemented using similar queuing mechanisms.

The synchronized broadcasts property described above may be maintained by implementing address network 150 and data network 152 in accordance with certain network conveyance properties and/or by controlling queues 720 according to certain queue control properties. In some embodiments, address network 150 and data network 152 are implemented such that the maximum skew from when any broadcast (conveyed on address network 150) arrives at any first client device to when the same broadcast arrives at any second client device is less than or equal to the minimum latency for any message sent on the data network 152 from the first to the second client device. Such an implementation results in the following Network Conveyance Property (which is identical to the synchronized broadcasts property, except that it is stated in terms of packet arrivals (i.e., when packets arrive at in-queues 720B and 720C) rather than receptions (i.e., when a packet affects ownership status and/or access rights in the receiving device)): If a data packet D1 is sent from a processor P1 to a processor P2, and if a broadcast B1 arrives at P1 before D1 is sent, then B1 arrives at P2 before D1 arrives at P2.

To verify that the Network Conveyance Property holds true for such a system, consider packets B1 and D1 referred to in the Network Conveyance Property stated above, and define symbols for the times at which various events occur, as follows:

| Symbol | Event |
|--------|-------|
| W | Arrival of B1 at P1 |
| X | Sending of D1 from P1 |
| Y | Arrival of B1 at P2 |
| Z | Arrival of D1 at P2 |

The symbol '<' is used to indicate that an event occurs before another event, e.g. A<B would indicate that event A occurs before event B. The symbol '<=' is used to indicate that an event occurs before or simultaneously with another event, e.g. A<=B would indicate that event A occurs before or simultaneously with event B. Also, let S represent the maximum amount of time from when any given broadcast arrives at P1 to the time when the given broadcast arrives at P2 and let L represent the minimum amount of time from when a packet sent on the data network from P1 (destined for P2) until that packet arrives at P2. The symbol '+' is used to indicate the addition of time to an event, e.g. A+S would indicate the addition of S to event A.

Assume that W<X, i.e. B1 arrives at P1 before P1 sends D1. In order to prove that the Network Conveyance Property holds, it must be shown that Y<Z, i.e. B1 arrives at P2 before D1 arrives at P2. Note that Y<=W+S (from the definition of S), W<X (from the assumption above), and S<=L (from the construction of the address network and the data network). Thus, Y<X+L. Furthermore, X+L<=Z (from the definition of L), so it follows that Y<Z (and that the Network Conveyance Property holds).

In addition to implementing address network 150 and 152 such that the Network Conveyance Property holds, address-in queue 720C and data-in queue 720B are controlled by a queue control circuit 760 such that packets from the address and data networks are placed in the respective queue upon arrival and are removed (and thus received) in the order they are placed in the queues (i.e., on a first-in, first-out basis). Furthermore, no data packet is removed from the data-in queue 720B for processing until all address packets that arrived earlier than the data packet have been removed from the address-in queue 720C.

In one embodiment, queue control circuit 760 may be configured to store a pointer along with an address packet when it is stored in an entry at the tail of the address-in queue 720C. The pointer indicates the next available entry in the data-in queue 720B (i.e., the entry that the data-in queue 720C will use to store the next data packet to arrive). In such an embodiment, address packets are received (i.e., they affect the access rights of corresponding blocks in cache 710) after being popped from the head of address-in queue 720C. Queue control circuit 760 may be configured to prevent a particular data packet from being received (i.e., processed by cache 710 in such a way that access rights are affected) until the pointer corresponding to the address packet at the head of the address-in queue 720C points to an entry of data-in queue 720B that is subsequent to the entry including the particular data packet. In this manner, no data packet is removed from the data-in queue 720B for processing until all address packets that arrived earlier than the data packet have been removed from the address-in queue 720C.

In an alternative embodiment, queue control circuit 760 may be configured to place a token in the address-in queue 720C whenever a packet is placed in the data-in queue 720B. In such an embodiment, queue control 760 may prevent a packet from being removed from the data-in queue 720B until its matching token has been removed from the address-in queue 720C. It is noted that various other specific implementations of queue control circuit 760 to control the processing of packets associated with queues 720 are contemplated.

By controlling address-in queue 720C and data-in queue 720B in this manner and by implementing address network 150 and data network 152 in accordance with the Network Conveyance Property discussed above, computer system 140 may maintain the synchronized broadcasts property. To evidence this, consider packets B1 and D1 as in the definition of the synchronized broadcasts property and define times as follows:

| Symbol | Event |
|--------|-------|
| W | Arrival of B1 at P1 |
| W' | Processing of B1 at P1 |
| X | Sending of D1 from P1 |
| Y | Arrival of B1 at P2 |
| Y' | Processing of B1 at P2 |
| Z | Arrival of D1 at P2 |
| Z' | Processing of D1 at P2 |

Assume that W'<X. In order to prove that the synchronized broadcasts property holds, it must be shown that Y'<Z'. Note that W<=W' (since a packet must arrive before it can be received and processed), so W<X. Therefore, Y<Z (from the Network Conveyance Property). As a result, Y'<Z' since data packets in the data-in queue 720B cannot overtake address packets in the address-in queue 720C.

Figure 8A:
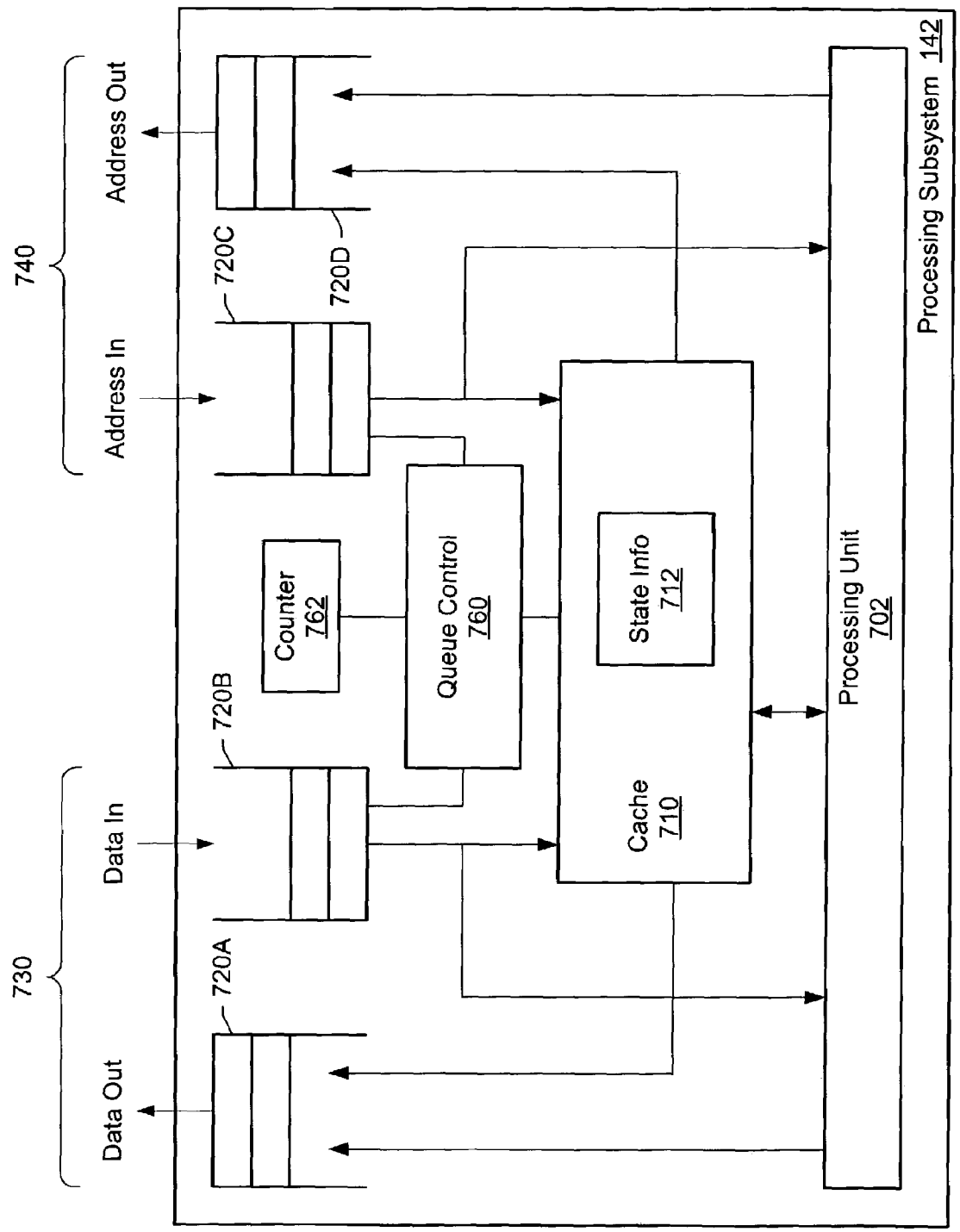
FIG. 8A is a block diagram illustrating details of another embodiment of each of the processing subsystems of FIG. 1.

In alternative embodiments, the synchronized broadcasts property may be satisfied by inhibiting reception of data packets based on the value of a timestamp associated with each data packet. As used herein, a timestamp is a value indicative of a logical time at which an event associated with a packet occurs. FIG. 8A shows a block diagram of another embodiment of a processing subsystem 142 that is configured to inhibit reception of data packets using timestamps. The embodiment of FIG. 8A includes counter 762 in addition to the components shown in FIG. 8. In some embodiments, processing subsystem 142 may use counter 762 to implement the synchronized broadcast property using timestamps. Each entry in data-in queue 720B may be configured to store a data packet and a timestamp associated with that data packet. Data-in queue 720B may be configured as a FIFO queue in some embodiments. As in FIG. 8, address-in queue 720C may be configured as a FIFO queue in order to satisfy the ordered broadcast property. Note that some embodiments that use timestamps to implement the synchronized broadcasts property may not limit the skew of the address network as described above.

In some embodiments, counter 762 may be used to indicate the number of address packets that processing subsystem 142 has received. For example, counter 762 may be incremented each time an address packet is received (e.g., queue control 760 may increment counter 762 each time an address packet is popped from address-in queue 720C). When processing subsystem 142 sends a data packet, it may attach a timestamp equal to the current value of counter 762 to the data packet. Each device's counter 762 may be initialized to the same value (e.g., zero) at the same time (e.g., when the computer system is powered on or reset).

When data packets and their corresponding timestamps arrive at processing subsystem 142, they may be added to data-in queue 720B. Processing subsystem 142 may be configured to inhibit reception of the data packet until the value of counter 762 is greater than and/or equal to the timestamp of the data packet. For example, queue control unit 760 may be configured to compare the current value of counter 762 to one or more of the timestamps of data packets in data-in queue 720B. If the current value of counter 762 is less than a data packet's timestamp, reception of that data packet may be inhibited. In some embodiments, reception of data packets may also be inhibited if the data packets' timestamp values are equal to the current value of counter 762. In alternative embodiments, a processing subsystem or other device may be configured to receive a data packet based on other comparisons (e.g., each device may decrement its counter 762 each time an address packet is received, and reception of a data packet may be inhibited until the timestamp of the data packet is greater than (and/or equal to) the current value of the counter).

In an alternative embodiment, the address network may assign timestamps to each address packet conveyed on the address network. For example, if the address network is tree-structured, the root of the address network may assign timestamps to each address packet. In one embodiment, the address network may assign timestamps in increasing order to successive address packets. Address-in queue 720C may be configured to store both address packets and their associated timestamps. In such an embodiment, instead of assigning each data packet a timestamp based on the current value of a counter, each processing subsystem 142 may, for example, assign timestamps to data packets based on the timestamp of the most recently received address packet (e.g., a data packet's time stamp may equal the timestamp of the most recently received address packet in one embodiment). Reception of data packets may then be inhibited based on the value of the data packet's timestamp relative to the value of the timestamp of an address packet (e.g., the most recently received address packet). For example, in one embodiment, reception of a data packet may be inhibited until an address packet with a timestamp greater than or equal to the timestamp of the data packet has been received.

In some embodiments, each data packet entry may include a "receivable" field or flag indicative of whether the data packet stored in the entry is currently receivable. Queue control 760 may update the receivable field based on the outcome of the comparison of the data packet's timestamp with the current value of counter 762 or the timestamp of an address packet. In such embodiments, counter 762 and the timestamps may have a bounded size. In one embodiment, receivable data packets may be popped from the data-in queue 720B in the order in which they arrived.

As noted above, the synchronized broadcasts property requires that if a data packet D1 is sent from a first device P1 to a second device P2 after P1 receives an address packet A1, and if A1 is received by both P1 and P2, then the data packet D1 will be received by P2 after P2 processes A1. In a system where P1 and P2 are configured to inhibit data packet receptions based on timestamp values, P1 may assign a timestamp to D1 when D1 is sent. When P2 receives D1, it may compare D1's timestamp to the value of its counter 762. Alternatively, if the address network assigns timestamps to address packets, P2 may compare D1's timestamp to the timestamp of an address packet (e.g., to the timestamp of the most recently received address packet). If the value of D1's timestamp indicates that D1 may be received (e.g., D1's timestamp is less than P2's counter or less than the timestamp of the most recently received address packet at P2), then P2 has received at least as many address packets as P1 had received prior to sending D1 and P2 may receive D1. If the value of D1's timestamp indicates that P2 has not received as many address packets as P1 had received when it sent D1, P2 will inhibit reception of the data packet. Recall that the ordered broadcasts property insures that all devices process address packets in the same order. By using a timestamp value to inhibit reception of a data packet until P2 has received at least as many address packets as P1 had received when it sent the data packet, P2 may comply with the synchronized broadcasts property.

To verify that the synchronized broadcasts property holds, consider any address packet B1 and any data packet D1. Assume that the computer system satisfies the ordered broadcasts property. Let X be the timestamp assigned to D1. If B1 is received at a first device before D1 is sent from the first device, then B1 is at most the X-th address packet received at the first device. Since address packets are processed at each device in the same order that they arrive, it follows that the i-th address packet to arrive at the first device is identical to the i-th address packet to arrive at a second device for any value of i. Therefore, B1 is at most the X-th address packet to arrive at the second device and the requirement that D1 not be processed by the second device until the second device's counter is at least X insures that B1 is processed at the second device before the second device processes D1. Thus, the synchronized broadcasts property holds.

In one embodiment, counter 762 may be an unbounded size counter. Similarly, in embodiments where the address network assigns timestamps to address packets, the address network may include an unbounded size counter that it uses to assign timestamps to address packets. In alternative embodiments, counter 762 or the counter in the address network may be configured as a bounded size counter. Bounded size counters may be used if the number of address packets that may be buffered in address-in queue 720C and in the address network places a practical bound on the difference between the counters (or the difference between the timestamps of the most recently received address packets) at different devices. If the maximum potential difference is a number D, then bounded size counter may be used and each data packet's timestamp may still be interpreted correctly if the counters have at least 2D+1 possible values. For example, if a data packet's timestamp is already less than or equal to the destination device's counter when it arrives at the destination device's data-in queue 720B, reception of that data packet will not be inhibited. If a data packet's timestamp is greater than the destination device's counter when it arrives, the data packet's reception may be inhibited until the counter value equals (and/or is greater than) the data packet's timestamp.

In some embodiments that use bounded size counters, situations may arise where a data packet is delayed in the data network and, as a result, it may have a timestamp that appears to indicate that it may not be processed by the destination device, even though the data packet could in fact be processed without violating the synchronized broadcasts property. If no additional address packets arrived, a deadlock situation could ensue. This problem may be avoided, however, by forcing a continuous sequence of address packets (e.g., null address packets) through the network and/or using barriers in the data network when packet timestamps wrap-around.

Certain types of flow control may potentially cause a deadlock in a system that uses timestamps to inhibit receipt of data packets. Specifically, if a first device blocks address packets from arriving because it has limited buffer space in its address-in queue, and if the ability to remove address packets from the address-in queue depends on the processing of a data packet, deadlock may be possible. For example, a first device P1 may have an address packet B1 at the head of its address-in queue 720C. P1 may be unable to receive any additional address packets until it receives a data packet D1. A second device P2 may send D1 to P1 in response to P2's receipt of B1. If P2 sends D1 after P2 receives B1 and a second address packet B2, D1 will have a timestamp indicating that P1 may not process D1 until after P1 receives B2. Since P1 cannot process B2 until it processes B1, deadlock may result. Such a deadlock condition may be prevented by several methods. For example, if global flow control is used on the address network, in which all devices receive the same set of packets after flow control is asserted, and if all devices assert flow control early enough to guarantee that they may remove all packets from their address-in queue 720C, the type of deadlock described above may not occur. Alternatively, if all devices have enough buffer space that they may always receive all packets from their address-in queue 720C, the type of deadlock described above may not occur.

Figure 9:
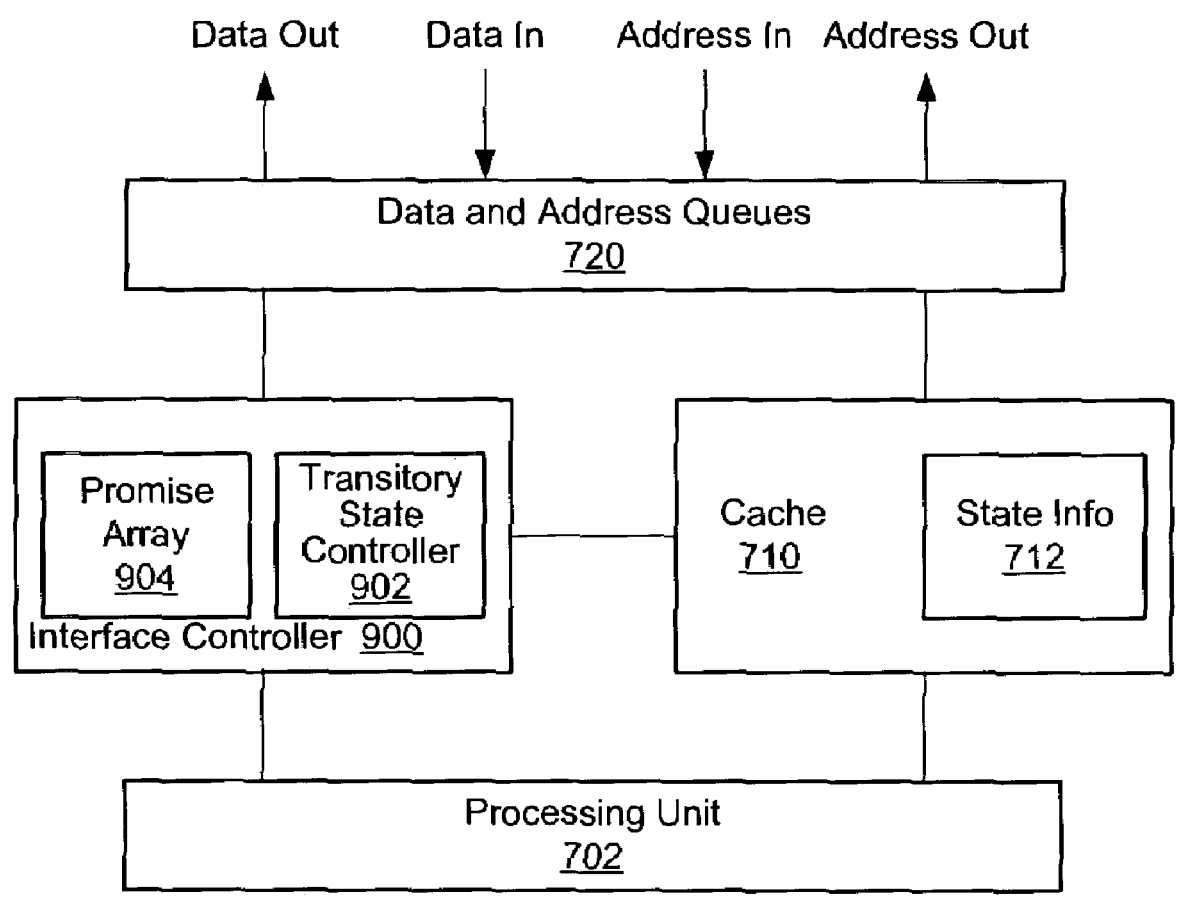
FIG. 9 is a block diagram illustrating further details regarding one embodiment of each of the processing subsystems of FIG. 1.

Turning next to FIG. 9, further details regarding an embodiment of each of the processing subsystems 142 of FIG. 1 are shown. Circuit portions that correspond to those of FIG. 8 are numbered identically.

FIG. 9 depicts an interface controller 900 coupled to processing unit 702, cache 710, and data and address queues 720. Interface controller 900 is provided to control functionality associated with the interfacing of processing subsystem 142 to other client devices through address network 150 and data network 152. More particularly, interface controller 900 is configured to process various requests initiated by processing unit 702 that require external communications (e.g., packet transmissions) to other client devices, such as load and store requests that require the generation of read-to-share and read-to-own transactions. Interface controller 900 is also configured to process communications corresponding to transactions initiated by other client devices. In one particular implementation, interface controller 900 includes functionality to process transactions in accordance with the foregoing description, including that associated with the processing of the coherence operations as illustrated in FIGS. 7A-7F. For this purpose, functionality depicted as transitory state controller 902 is provided within interface controller 900 for processing outstanding local transactions (that is, transactions initiated by processing sub system 142 that have not reached a stable completed state). To support this operation, information relating to the processing of coherence operations (including state information) may be passed between interface controller 900 and cache 710. Transitory state controller 902 may include multiple independent state machines (not shown), each of which may be configured to process a single outstanding local transaction until completion.

The functionality depicted by transitory state controller 902 may be configured to maintain various transitory states associated with outstanding transactions, depending upon the implementation and the types of transactions that may be supported by the system. For example, from the exemplary transaction illustrated in FIG. 7B, device D2 enters a transitory state IO after receiving its own RTO and prior to receiving a corresponding data packet from device D1. Similarly, device D1 enters transitory state WN in response to receiving the RTO from device D2 that is maintained until the corresponding data packet is sent to device D2. In one embodiment, transitory state controller 902 maintains such transitory states for pending local transactions to thereby control the processing of address and data packets according to the coherence protocol until such local transactions have completed to a stable state.

Referring back to FIG. 5C, it is noted that states WO, RO, RN, and IN are equivalent to corresponding states defined by the well-known MOSI coherence protocol. These four states, in addition to state WN, are stable states. The other states depicted in FIG. 5C are transient and only exist during the processing of a local transaction by interface controller 900. In addition, in one embodiment, the state WN may not be maintained for cache blocks that do not have a local transaction pending since it may be possible to immediately downgrade from state WN to state RN for such cache blocks. As a result, in one particular implementation, only two bits of state information are maintained for each cache block within state information storage 712 of cache 710. Encodings for the two bits are provided that correspond to states WO, RO, RN, and IN. In such an embodiment, transitory state information corresponding to pending local transactions may be separately maintained by transitory state controller 902.

Figure 10:
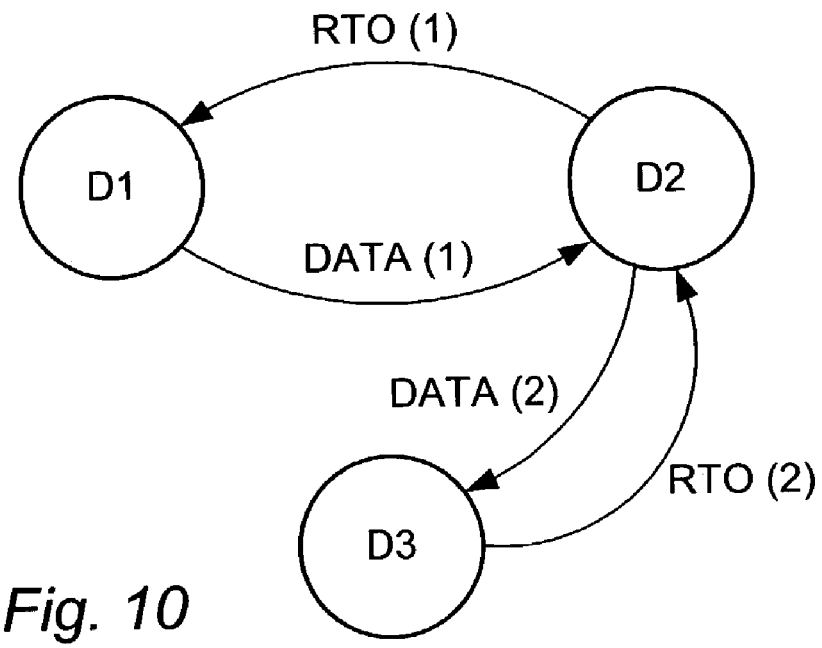
FIG. 10 is a diagram illustrating multiple coherence transactions initiated for the same cache block.

Various additional transitory states may also result when a coherence transaction is initiated by an active device while a coherence transaction to the same cache block is pending within another active device. For example, FIG. 10 illustrates a situation in which an active device D1 has a W access right and ownership, and an active device D2 initiates an RTO transaction in order to obtain a W access right. When D1 receives the RTO packet from D2 through address network 150, D1 changes its ownership status to N (non-owner). D2 changes its ownership Status to O (Owner) when it receives its own RTO through address network 150. It may be possible that another active device D3 subsequently issues another RTO to the same cache block which is received by D2 through address network 150 before a corresponding data packet is received at D2 from D1. In this situation, D2 may change its ownership status to N (non-owner) when the second RTO is received. In addition, when D3 receives its own RTO through address network 150, its ownership status changes to O (Owner). When a corresponding data packet is received by D2 from D1, D2's access right changes to a write access right. D2 may exercise this write access right repeatedly, as desired. At some later time, a corresponding data packet may be sent from D2 to D3. When the data is received by D3, it acquires a W access right. Such operations and transitory state transitions may be performed and maintained by the functionality depicted by transitory state controller 902, as needed, based upon the types of transactions that may be supported and the particular sequence of packet transmissions and receptions that may occur, as well as upon the particular coherence methodology that may be chosen for a given implementation.

As illustrated, the interface controller 900 depicted in FIG. 9 may further include a promise array 904. As described above, in response to a coherence transaction, a processing subsystem that owns a cache block may be required to forward data for the cache block to another device. However, the processing subsystem that owns the cache block may not have the corresponding data when the transaction is received. Promise array 904 is configured to store information identifying data packets that must be conveyed to other devices on data network 152 in response to pending coherence transactions as dictated by the coherence protocol.

Promise array 904 may be implemented using various storage structures. For example, promise array 904 may be implemented using a fully sized array that is large enough to store information corresponding to all outstanding transactions for which data packets must be conveyed. In one particular implementation, each active device in the system can have at most one outstanding transaction per cache block. In this manner, the maximum number of data packets that may need to be forwarded to other devices may be bound, and the overall size of the promise array may be chosen to allow for such maximum number of data promises. In alternative configurations, address transactions may be flow-controlled in the event promise array 904 becomes full and is unable to store additional information corresponding to additional data promises. Promise array 904 may include a plurality of entries, each configured to store information that identifies a particular data packet that needs to be forwarded, as well as information identifying the destination to which the data packet must be forwarded. In one particular implementation, promise array 904 may be implemented using a linked list.

Figure 11:
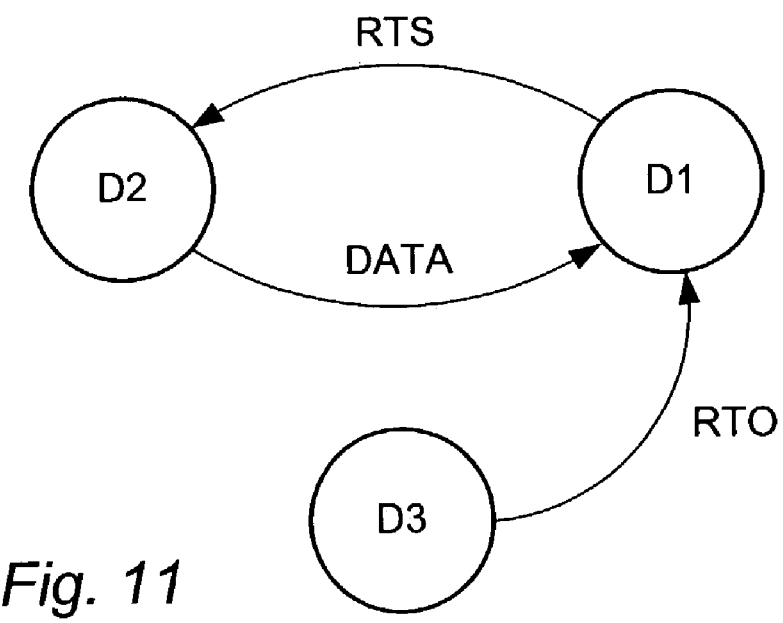
FIG. 11 is a diagram illustrating communications between active devices in accordance with one embodiment of a computer system.

Turning next to FIG. 11, it is noted that systems that employ general aspects of the coherence protocols described above could potentially experience a starvation problem. More particularly, as illustrated, an active device D1 may request a read-only copy of a cache block to perform a load operation by conveying a read-to-share (RTS) transaction upon address network 150. However, as stated previously, a corresponding data packet may not be conveyed to D1 from D2 (i.e., the owning device) until some time later. Prior to receiving the corresponding data packet, device D1 has the cache block in an I (Invalid) state. It is possible that prior to receiving the corresponding data packet, that a device D3 may initiate an RTO (or other invalidating transaction) that is received by D1 ahead of the corresponding data packet. This situation may prevent device D1 from gaining the read access right to the cache block since the previously received RTO may nullify the effect of the first request. Although device D1 may issue another RTS to again attempt to satisfy the load, additional read-to-own operations may again be initiated by other active devices that continue to prevent device D1 from gaining the necessary access right. Potentially, requests for shared access to a cache block could be nullified an unbounded number of times by requests for exclusive access to the cache block, thus causing starvation.

Such a starvation situation can be avoided by defining certain loads as critical loads. Generally speaking, a critical load refers to a load operation initiated by an active device that can be logically reordered in the global order without violating program order. In one embodiment that implements a TSO (Total Store Order) memory model, a load operation is a critical load if it is the oldest uncommitted load operation initiated by processing unit 702. To avoid starvation, in response to an indication that an outstanding RTS corresponds to a critical load and receipt of an intervening foreign RTO transaction to the same block (before a corresponding data packet for the RTS is received) transitory state controller 902 may be configured to provide a T (Transient-Read) access right to the cache block upon receipt of the data packet. The T access right allows the load to be satisfied when the data packet is received. After the load is satisfied, the state of the cache block is downgraded to I (Invalid). This mechanism allows critical loads to be logically reordered in the: global order without violating program order. The load can be viewed as having logically occurred at some point right after the owner (device D2) sends the corresponding data packet to D1 (or to D3) but before the device performing the RTO (device D3) receives its corresponding data packet. In this manner, the value provided to satisfy the load in device D1 includes the values of all writes prior to this time and none of the values of writes following this time.

In one particular implementation, processing unit 702 may provide an indication that a load is the oldest uncommitted load when the load request is conveyed to interface controller 900. In another embodiment, a load may be indicated as being a critical load if it is the oldest uncommitted load at the time the local RTS is conveyed on address network 150. In still a further embodiment, a load may be indicated as being a critical load if it is the oldest uncommitted load at the time the foreign invalidating RTO is received.

It is noted that, in the scenario described in conjunction with FIG. 11, if the RTS is not indicated as being associated with a critical load, transitory state controller 902 may maintain the cache block in the I (Invalid) state (rather than assigning the T state) in response to receiving the corresponding data.

It is also noted that in systems that implement other memory models, a load operation may be a critical load (i.e., a load operation that can be logically reordered in the global order) when other conditions exist. For example, in a system that implements sequential consistency, a load operation may be defined as a critical load if there are no older uncommitted load or store operations.

Numerous variations in the system described above are contemplated. For example, while the address network 150 described above implements a broadcast network, other systems are contemplated in which address transactions may be conveyed point-to-point or to subsets of client devices. Such systems may employ general aspects of the protocols described above for transitioning access rights in active devices.

Figure 12:
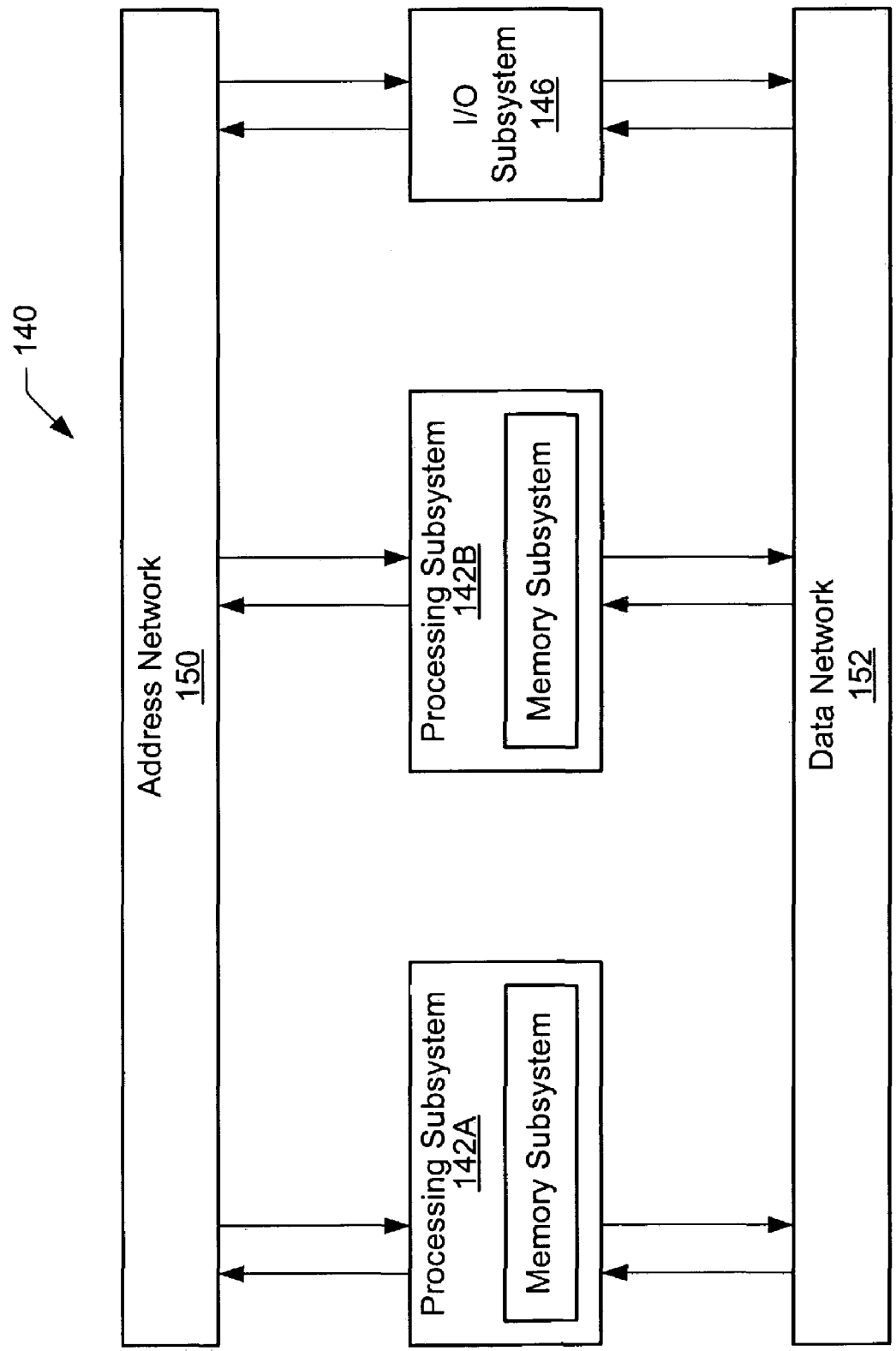
FIG. 12 is a block diagram of another embodiment of a multiprocessing computer system.

In addition, it is noted that embodiments are possible in which memory subsystems 144 are integrated with the functionality of processing subsystems 142, as depicted in FIG. 12. In such embodiments, the conveyance of certain packets on the address and/or data networks as discussed above for particular coherence transactions may not be necessary.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

We claim:

1. A computer system comprising:
   a system memory;
   a first active device configured to access data stored in the system memory, wherein the first active device includes a first cache configured to store data accessed by the first active device;
   an address network for conveying address packets between the first active device and the system memory;
   a data network for conveying data packets between the first active device and the system memory;
   a second active device including a second cache;
   wherein the first cache is configured to transition an access right corresponding to a given block allocated in the first cache in response to a corresponding data packet being received by the first cache;
   wherein the first cache is configured to transition an ownership responsibility for the given block allocated in the first cache in response to a corresponding address packet being received by the first cache, wherein the first cache is configured to transition the access right at a different time than the ownership responsibility transitions;

wherein the first cache is configured to inhibit receipt of the corresponding data packet based on a value of a timestamp associated with the corresponding data packet; and wherein the second active device is configured to assign the timestamp to the corresponding data packet and to send the timestamp and the corresponding data packet on the data network to the first active device.

2. The computer system as recited in claim 1, wherein the first active device includes a data-in buffer configured to store the corresponding data packet and the timestamp, an address-in buffer configured to store the corresponding address packet, and a counter configured to increment when the corresponding address packet is received by the first cache from the address-in buffer, wherein the first cache is configured to inhibit receipt of the corresponding data packet from the data-in buffer depending upon a current value of the counter and the value of the timestamp.

3. The computer system as recited in claim 1, wherein the first active device includes a data-in buffer configured to store the corresponding data packet and the timestamp, an address-in buffer configured to store the corresponding address packet and an address timestamp associated with the corresponding address packet, wherein the first cache is configured to receive the corresponding address packet from the address-in buffer, wherein the first cache is configured to inhibit receipt of the corresponding data packet from the data-in buffer if a value of the address timestamp is less than the value of the timestamp.

4. The computer system as recited in claim 3, wherein the address network is configured to assign the address timestamp to the corresponding address packet.

5. The computer system as recited in claim 1, wherein the value of the timestamp is equal to a value of a counter included in the second active device at a time when the second active device sent the corresponding data packet, wherein the counter is configured to increment each time the second active device receives an address packet.

6. The computer system as recited in claim 1, wherein the value of the timestamp is equal to an address timestamp of a most-recently received address packet received by the second active device.

7. The computer system as recited in claim 1, wherein the second cache is configured to transition an access right corresponding to another block allocated in the second cache in response to another corresponding data packet being received by the second cache through the data network.

8. The computer system as recited in claim 1, wherein corresponding address packet is a read-to-own packet.

9. The computer system as recited in claim 8, wherein the corresponding data packet received by the first cache is conveyed through the data network from the second active device in response to the read-to-own packet.

10. The computer system as recited in claim 9, wherein the second cache is configured to transition an access right of a block allocated in the second cache that corresponds to the read-to-own packet in response to the second active device sending the corresponding data packet.

11. The computer system as recited in claim 10, wherein the second cache is configured to transition an ownership state corresponding to the block allocated in the second cache that corresponds to the read-to-own packet in response to the second cache receiving the read-to-own packet.

12. The computer system as recited in claim 11, further comprising a third active device including a third cache, wherein the third cache is configured to transition an access right of a corresponding block allocated in the third cache from a read access right to an invalid access right in response to the read-to-own packet being received by the third cache through the address network.

13. The computer system as recited in claim 1, wherein the corresponding data packet is provided to the first cache through the data network in response to a write stream packet sent by the first active device, and wherein the corresponding data packet is sent by a previous owner of a cache block corresponding to the write stream packet.

14. The computer system as recited in claim 13, wherein the corresponding data packet is an encoded acknowledgment that excludes data corresponding to the cache block.

15. A method comprising:
a first active device accessing data stored in a system memory, wherein the first active device includes a first cache configured to store data accessed by the first active device;
an address network conveying address packets between the first active device and the system memory;
a data network conveying data packets between the first active device and the system memory;
transitioning an access right corresponding to a given block allocated in the first cache in response to a corresponding data packet being received by the first cache;
transitioning an ownership responsibility for the given block allocated in the first cache in response to a corresponding address packet being received by the first cache, wherein the access right transitions at a different time than the ownership responsibility transitions;
the first cache inhibiting receipt of the corresponding data packet based on a value of a timestamp associated with the corresponding data packet; and
a second active device assigning a timestamp to the corresponding data packet and sending the timestamp and the corresponding data packet on the data network to the first active device.

16. The method as recited in claim 15, wherein the corresponding address packet is a read-to-own packet.

17. The method as recited in claim 16, wherein the second active device includes a second cache, and wherein the method further comprises conveying the corresponding data packet received by the first cache through the data network from the second active device in response to the read-to-own packet.

18. The method as recited in claim 17, further comprising transitioning an access right of a block allocated in the second cache that corresponds to the read-to-own packet in response to the second active device sending the corresponding data packet.

19. The method as recited in claim 18, further comprising transitioning an ownership state corresponding to the block allocated in the second cache that corresponds to the read-to-own packet in response to the second cache receiving the read-to-own packet.

20. The method as recited in claim 19, further comprising transitioning an access right of a corresponding block allocated in a third cache of a third active device from a read access right to an invalid access right in response to the read-to-own packet being received by the third cache through the address network.

* * * * *

UNITED STATES PATENT AND TRADEMARK OFFICE
CERTIFICATE OF CORRECTION

| | |
|---|---|
| PATENT NO. | : 7,366,843 B2 |
| APPLICATION NO. | : 10/610009 |
| DATED | : April 29, 2008 |
| INVENTOR(S) | : Cypher et al. |

It is certified that error appears in the above-identified patent and that said Letters Patent is hereby corrected as shown below:

Title Page, col. 1, item (75), please delete "Madison, WA" and substitute -- Madison, WI--.

Signed and Sealed this

Twenty-ninth Day of July, 2008

JON W. DUDAS
*Director of the United States Patent and Trademark Office*